US010459776B2

(12) United States Patent
Che (10) Patent No.: US 10,459,776 B2
(45) Date of Patent: Oct. 29, 2019

(54) TRANSMISSION OF LARGE MESSAGES IN COMPUTER SYSTEMS

(71) Applicant: Advanced Micro Devices, Inc., Sunnyvale, CA (US)

(72) Inventor: Shuai Che, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 193 days.

(21) Appl. No.: 15/614,498

(22) Filed: Jun. 5, 2017

(65) Prior Publication Data

US 2018/0349215 A1 Dec. 6, 2018

(51) Int. Cl.
*G06F 9/54* (2006.01)

(52) U.S. Cl.
CPC .............. *G06F 9/546* (2013.01); *G06F 9/544* (2013.01)

(58) Field of Classification Search
CPC ...................................................... G06F 9/546
See application file for complete search history.

(56) References Cited

U.S. PATENT DOCUMENTS

2006/0069788 A1* 3/2006 Blackmore ............. H04L 51/18
709/230

OTHER PUBLICATIONS

Buntinas, D. et al, "Implementation and Shared-Memory Evaluation of MPICH2 over the Nemesis Communication Subsystem", Recent Advances in Parallel Virtual Machine and Message Passing Interface, Lecture Notes in Computer Science, 2006, 10 pgs., vol. 4192, Springer, Berlin, DE.
Bayatpour, M. et al. "Adaptive and Dynamic Design for MPI Tag Matching", 2016 IEEE International Conference on Cluster Computing, Sep. 12-16, 2016, pp. 1-10, IEEE, Taipei, TW.
Bloom, Burton H., "Space/Time Trade-offs in Hash Coding with Allowable Errors", Communications of the ACM, Jul. 1970, pp. 422-426, vol. 13, Issue 7, Computer Usage Company, Newton Upper Falls, MA.
Lam, Simon S., "Bloom Filters" Feb. 16, 2017, 22 pgs. (retrieved at: http://www.cs.utexas.edu/users/lam/396m/slides/Bloom_filters.pdf).

* cited by examiner

*Primary Examiner* — Andrew C Georgandellis
(74) *Attorney, Agent, or Firm* — Volpe and Koenig, P.C.

(57) ABSTRACT

Techniques for managing message transmission in a large networked computer system that includes multiple individual networked computing systems are disclosed. Message passing among the computing systems include a sending computing device transmitting a message to a receiver computing device and a receiver computing device consuming that message. A build-up of data stored in a buffer at the receiver can reduce performance. In order to reduce the potential performance degradation associated with large amounts of "waiting" data in the buffer, a sending computer system first determines whether the receiver computer system is ready to receive a message and does not transmit the message if the receiver computer system is not ready. To determine whether the receiver computer system is ready to receive a message, the receiver computer system, at the request of the sending computer system, checks a counting filter that stores indications of whether particular messages are ready.

16 Claims, 6 Drawing Sheets

FIG. 3A  Signal indicating receiver ready to receive "large" message 1

FIG. 3B  Probe for "large" message 1

FIG. 3C  After "large" message 1 sent to receiver, decrement buckets

TRANSMISSION OF LARGE MESSAGES IN COMPUTER SYSTEMS

BACKGROUND

High performance computing systems employ very large numbers of computing elements coupled together via a computing network fabric. Processing throughput of such systems is affected by many factors, including the performance of the network fabric. Improvements are constantly being made to these networking fabrics and to techniques being used to communicate via these networking fabrics.

BRIEF DESCRIPTION OF THE DRAWINGS

A more detailed understanding can be had from the following description, given by way of example in conjunction with the accompanying drawings wherein.

DETAILED DESCRIPTION

Techniques for managing message transmission in a large networked computer system (such as a high performance computing "HPC" system) that includes multiple individual networked computing systems are disclosed. In networked systems, individual computing systems perform processing work and pass messages to each other, where at least some such messages include data to be used for further processing. Message passing transactions include a sending computing device transmitting a message to a receiver computing device and a receiver computing device consuming that message. In many situations, a sending computing device transmits a message to the receiver computing device before the receiver computer device is ready to consume that message. In that situation, the receiver computer device stores the message in a buffer from which the message can be consumed at a later time.

A build-up of data stored in the buffer can reduce performance of the overall system. One way in which the buffer is quickly filled up is with receipt of "large" messages. More specifically, in some situations, a sending computer system groups together a large amount of data into a single message and then transmits that data to a receiver computer system. In other situations, a single message may simply include a very large amount of data. If the receiver computer system is not ready to consume the data, the data simply consumes space in the buffer of the receiver computer system. In order to reduce the potential performance degradation associated with large amounts of "waiting" data in the buffer of the receiver computer system, a sending computer system first determines whether the receiver computer system is ready to receive a message and does not transmit the message if the receiver computer system is not ready.

To determine whether the receiver computer system is ready to receive a message, the receiver computer system, at the request of the sending computing system, checks a counting filter that stores indications of whether particular messages are ready. A counting filter is a data structure that includes a number of buckets that store values. Each message has a unique identifier that maps to a specific set of buckets of the counting filter. The receiver computer system increments each bucket associated with a message when the receiver computer system is ready to receive the message and decrements each bucket associated with a message when the receiver computer system has consumed the message. If the buckets for a message are non-zero, then the receiver computer system is ready to receive the message and if at least one bucket for a message is zero, then the receiver computer system is not ready to receive the message. The counting filter is beneficial because searching a counting filter is a constant time operation and is faster than searching through other data structures. Further, implementing the counting filter to identify when a receiver computer system is ready to receive messages helps to reduce the amount of data stored in the buffer at the receiver computer system by preventing transmission of messages until the receiver computer system is ready to receive those messages.

Figure 1A:
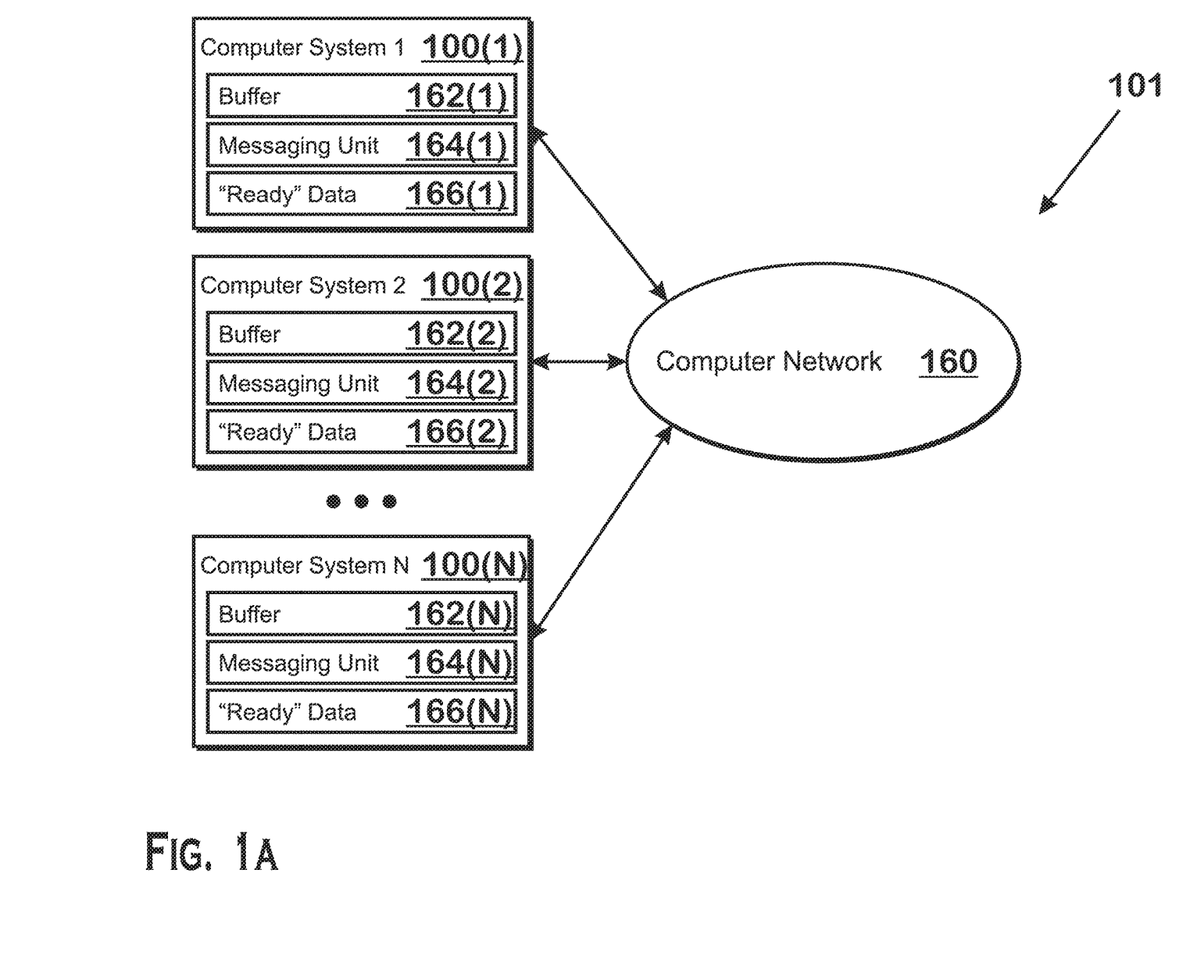
FIG. 1A is a block diagram of a networked computing system, according to an example.

FIG. 1A is a block diagram of a networked computing system 101, according to an example. In some implementations, the networked computing system 101 is or includes a high performance computing system that includes a very large number of individual computing systems 100 that are capable of cooperating to perform work. The computer systems 100 of the networked computing system 101 communicate over one or more computer networks 160 (although for clarity only one computer network 160 is illustrated in FIG. 1A). The computer network 160 is or includes any technically feasible computer network, such as a local area network, wide area network, wireless network, networks based on a torus interconnect-based network topology or a gemini interconnect-based network topology, a network based on the InfiniBand network topology, or any other technically feasible networking construct. The buffer 162, messaging unit 164, and "ready" data 166 are elements related to messaging and are described in further detail below.

Figure 1B:
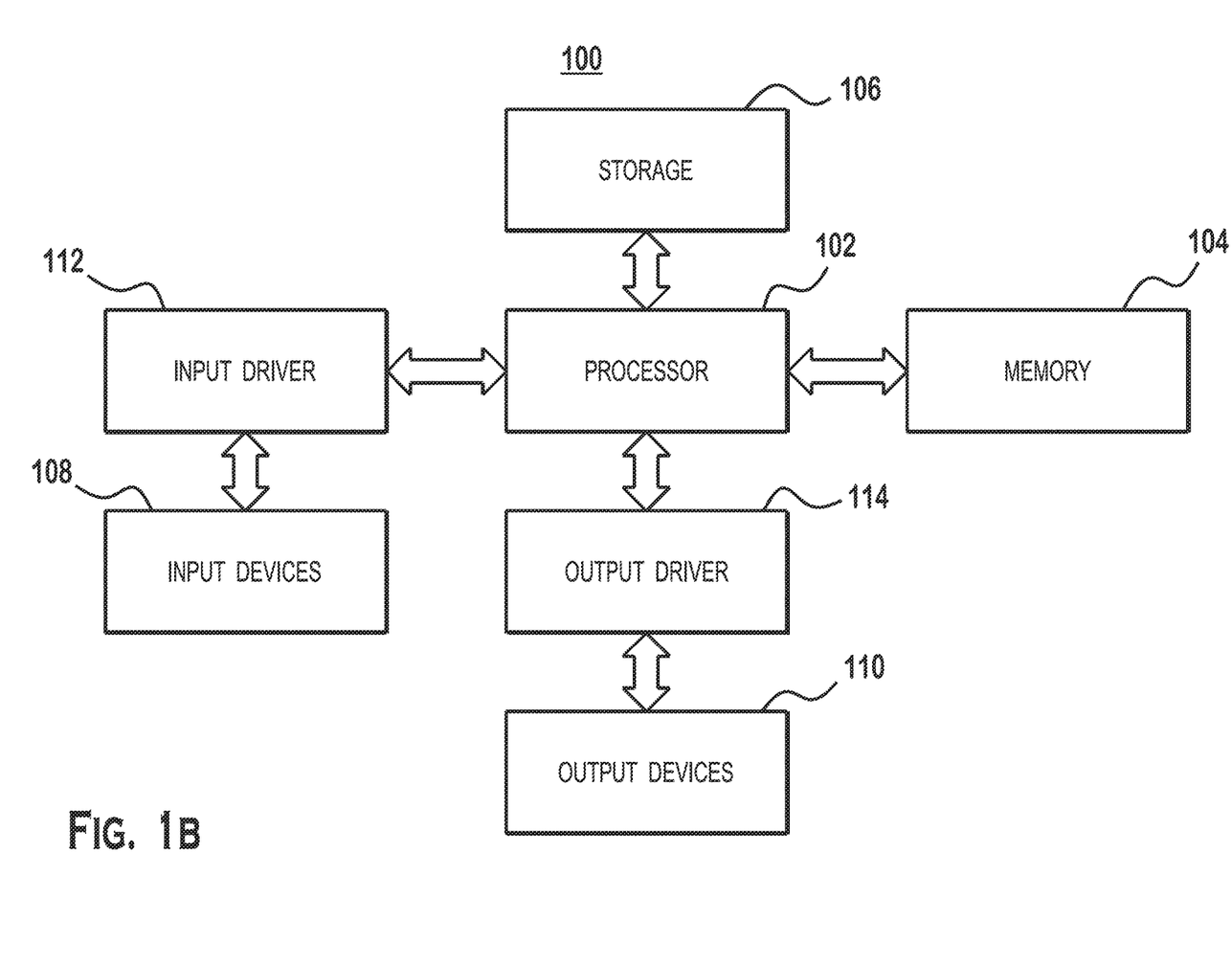
FIG. 1B is a block diagram illustrating aspects of elements of the networked computing system of FIG. 1A, according to an example.

FIG. 1B is a block diagram illustrating aspects of the computing systems 100 of FIG. 1A, according to an example. The computing systems 100 include a processor 102, a memory 104, a storage 106, one or more input devices 108, and one or more output devices 110. The computing system 100 also optionally includes an input driver 112 and an output driver 114. Additionally, the computing systems 100 optionally include one or more components not illustrated in FIG. 1.

In various alternatives, the processor 102 includes a central processing unit (CPU), a graphics processing unit (GPU), a CPU and GPU located on the same die, or any technically feasible combination of processing units or processor cores. In various example alternatives, the memory 104 is be located on the same die as the processor 102, or is located separately from the processor 102. The memory 104 includes a volatile, for example, random access memory (RAM), dynamic RAM, or a cache, and/or non-volatile memory.

The storage 106 includes a fixed or removable storage, for example, a hard disk drive, a solid state drive, an optical disk, or a flash drive, or any combination of one or more different types of fixed or removable storage device. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The individual computer systems 100 communicate with each other via a messaging paradigm, and include messaging units 164 to perform this communication. Communication in this manner is one technique to facilitate cooperation between the computing systems 100 to perform work in a scalable manner. In one common pattern, a computing task for processing a large amount of data is divided up for execution on the different computer systems 100 which perform independent tasks to process the large amount of data. Messages for facilitating cooperation to perform the computing task on the large amount of data, such as messages containing data to resolve data dependencies, are passed amongst the computer systems 100 as needed. The computer systems 100 also include message buffers 162, which store messages received from other computer systems 100. More specifically, when one computer system 100 transmits a message to another computer system 100, the receiver computer system 100(2) stores the message in a buffer 162 until that receiver computer system 100(2) consumes the message. "Consuming" a message means using the data in the message as a part of the processing task or to produce some other useful result independent from simply receiving the message from the sending computer system 100(1). The messaging units 164 may implement any technically feasible message passing system. One example is the Message Passing Interface standardized message passing system.

Each message that is passed is associated with a particular amount of overhead. Thus, when possible, applications executing on computer systems 100 tend to group data together and transmit the grouped together data in a single large message. In other situations, applications simply transmit very large messages that do not originate from multiple disparate data items grouped together. One issue with transmitting large messages, however, is that, if the destination computer system 100 receives a message but is not yet ready to consume the data in that message, then the message consumes space in the buffer 162 of the destination system for a relatively large amount of time. For this reason, the present disclosure presents techniques for improvement of communications for passing large messages.

Figure 2:
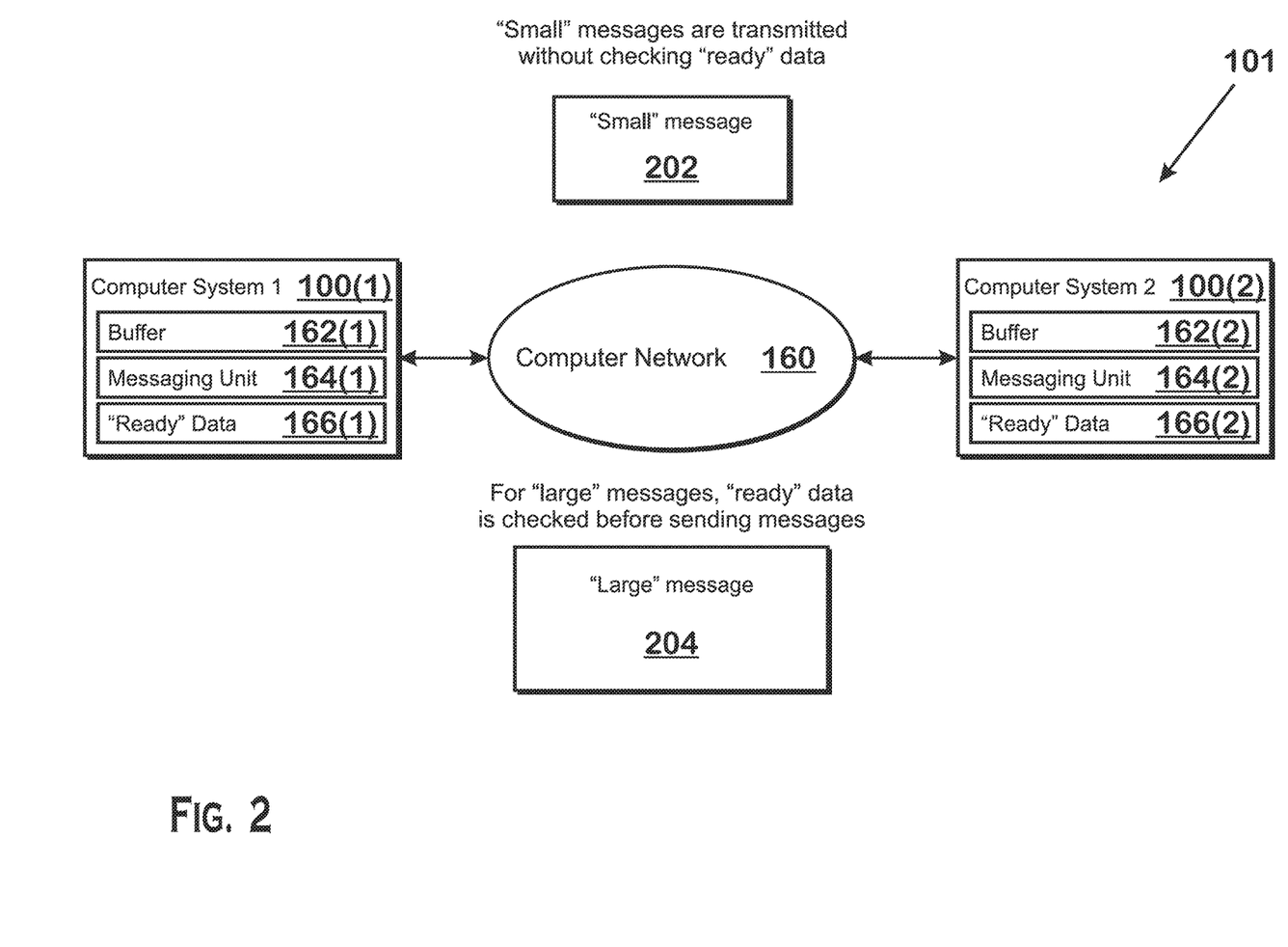
FIG. 2 illustrates additional aspects of the networked computing system, according to an example.

FIG. 2 illustrates additional aspects of the networked computing system 101, according to an example. Computer system 1 100(1) and computer system 2 100(2) are illustrated in FIG. 2, although it should be understood that the discussion of FIG. 2 applies similarly to other computer systems 100 of the networked computer system 101. Additionally, it should be understood that the computer network 160 illustrated represents one or more individual computer networks that communicatively couple the computer systems 100 of the networked computing system 101. In the following discussion, computer system 1 100(1) will be referred to as the sending computer system and computer system 2 100(2) will be referred to as the receiving computing system 100(2), indicating that computer system 1 100(1) is being described as transmitting a message and computer system 2 100(2) is being described as receiving a message. However, it should be understood that this designation is used for explanatory purposes only and that in various examples, computer system 1 100(1) and computer system 2 100(2) are capable of performing the roles of either or both of sending and receiving messages.

To improve messaging performance, a sending computer system 100(1) that has a "large" message to send first asks the receiver computer system 100(2) if the receiver computer system 100(2) is ready to receive that message. More specifically, the message passing paradigm is one in which a sender and receiver of a message both identify a particular message that is the subject of a transaction. For example, a sender specifies a message identifier and a receiver waits for the message having that particular identifier. Both the sender and the receiver would associate that message with a particular item of work. In one example, the first computer system 100 performs calculations for which operations of the second computer system 100 is dependent. Through the message identifier, the first computer system 100 identifies the message as being needed by the second computer system 100 for a particular calculation and through that same message identifier, the second computer system 100 identifies the message as being used in that calculation.

In the above example, the second computer system 100 may, at some particular point in time, not yet be ready to perform calculations using the message passed from the first computer system 100. For instance, the second computer system 100(2) may be performing some work prior to the work that uses the data in the message. If the first computer system 100(1) were to transmit the message at that point in time, then the message would be placed in the buffer 162(2) of the second computer system 100(2) and would remain unused, consuming space in the buffer 162(2). If the message is particularly large, then a large amount of space would be consumed in the buffer 162(2). This consumption of space in the buffer 162(2) could lead to slowdowns of the second computer system 100(2), for example, if no more space in the buffer 162(2) exists for other messages to be received.

To alleviate this kind of pressure on the buffers 162 of the computer systems 100, a computer system 100 that sends a "large" message (such as "large" message 204) first checks to see whether the receiver computer system 100(2) is ready to receive that message. A computer system 100 is ready to receive a message if that computer system 100 has arrived at a point in software that requests or waits for the message. In an example, with Message Passing Interface, a receiver computer system 100(2) would indicate that the receiver computer system 100(2) is ready to receive a message by calling the MPI_recv( ) function, identifying the specific message in the "tag" argument of the MPI_recv( ) function.

The sending computer system 100(1) checks whether the receiver computer system 100(2) is ready to receive a message by sending a ready probe. (Note that multiple ready probes may be grouped into a single grouped probe to reduce overhead). The ready probe specifies the message through an identifier. In response to receiving the ready probe, the receiver computer system 100(2) checks ready data 166 to determine if the receiver computer system 100(2) is ready to receive the message. If the ready data 166 indicates that the receiver computer system 100(2) is ready to receive the message, then the receiver computer system 100(2) informs the sending computer system 100(1) that the receiver computer system 100(2) is ready to receive the message. If the ready data indicates that the receiver computer system 100(2) is not ready to receive the message, then the receiver computer system 100(2) informs the sending computer system 100(1) that the receiver computer system 100(2) is not ready to receive the message.

The ready data 166 is updated in response to the receiver computer system 100(2) indicating readiness to receive a particular message. More specifically, in that scenario, the receiver computer system 100(2) updates the ready data 166 to include an indication that the receiver computer system 100(2) is ready to receive the particular message. In response to receiving a message (e.g., copying the message from the buffer 162 for use by an application or other software executing in the receiver computer system 100(2)), the receiver computer system 100(2) updates the ready data 166 to indicate that the receiver computer system 100(2) is not waiting for the message.

The ready data 166 is represented in a quick-to-search format. More specifically, the ready data 166 is represented as a counting filter, which is a modification of a Bloom filter that allows for deletions of elements from the data structure of the Bloom filter. A Bloom filter is a technique for storing data in a quick-to-search format. The Bloom filter includes a series of buckets that can have a zero or one value. To store data in the Bloom filter, a filter function (such as a hash) is applied to the data to identify a number of the buckets. The filter function applies a different function for each of a set number of buckets to be identified in order to determine which of the buckets is associated with the data. For example, if three buckets are to be identified, then three different functions are applied to the data, where the result of applying each function to the data is that a different one of the buckets is identified. The value for each identified bucket is then set to 1. A search for data includes a similar process, in which the filter function is applied to the data in order to identify a set of buckets that correspond to the data. The value of each such bucket is examined. If each such bucket has a value of 1, then the data is considered to be in the Bloom filter. False positives are possible because entry of multiple items of data into the filter can result in a pattern of buckets with value 1 that mimics the pattern of buckets for a value that is not actually stored in the filter.

A counting filter is a variation in which each bucket can have a value other than 0 or 1. More specifically, instead of setting the value of a bucket to 1 for each bucket that corresponds to a particular set of data, the value of each such bucket that is identified by applying a filter function (referred to herein also as a "counting filter function," for counting filters) is instead incremented. This allows removal of elements from the filter by decrementing the value of each bucket that corresponds to data. Identification of whether an item of data is in a set is done by determining whether the value for each bucket that corresponds to the data is non-zero (where a bucket "corresponds" to data if the filter function, when applied to the data, indicates that the bucket is one of the buckets to be incremented or decremented for that data). If all such buckets are non-zero, then the item of data is considered to be in the set. If at least one such bucket is zero, then the item of data is considered not to be in the set. False positives are still possible. False negatives are possible as well because each bucket has a maximum value.

If a bucket reaches a maximum value and an increment would occur, then the bucket remains at the maximum value. If the bucket reaches the maximum value, one or more increments occur, and then the bucket is decremented to 0, a false negative can occur because, due to the "capping out" of the bucket, the bucket may have the value of zero when it should instead be non-zero. The counting filter is useful for the ready data 166 because the counting filter allows for a quick lookup of whether a particular message is ready to be received by a receiver computer system 100(2). When a message is ready to be received, the identifier for that message is entered into the counting filter and when the data for the message is consumed, the identifier for the message is removed from the counting filter.

As described above, computer system 100 uses the ready data 166 to determine whether receiver computer systems 100(2) are ready to receive "large" messages. Computer systems 100 do not, however, use the ready data to determine whether messages that are not "large" (such as "small" message 202) are ready to be received and instead simply send the message to the receiver computer system 100(2) without a check. A message is considered "large" if the size of the message is above a threshold. In some examples, the threshold is determined based on the memory capacity and buffer size of the receiving computer, or the average buffer utilization (i.e., average percentage of used space).

Figure 3A:
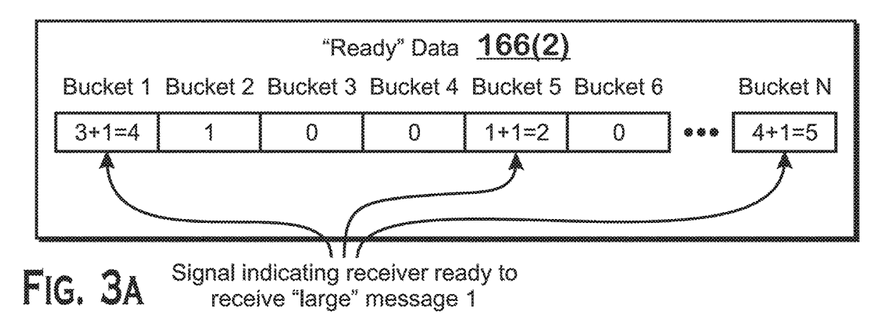
FIGS. 3A-3E illustrate various examples of manipulating a counting filter to track messages that a computer system is ready to receive.

FIGS. 3A-3E illustrate various examples of manipulating a counting filter to track the messages that a computer system 100 is ready to receive. FIG. 3A illustrates an operation in which a receiver computer system 100(2) updates associated ready data 166 in response to the receiver computer system 100(2) becoming ready to receive a particular message. More specifically, in response to the receiver computer system 100(2) becoming ready to receive a message, the receiver computer system 100(2) identifies buckets that correspond to the message identifier and increments the values in those buckets. In FIG. 3A, the buckets are identified based on message 1 and include bucket 1, bucket 5, and bucket N. Because these buckets are identified, the values in these buckets are incremented.

Figure 3B:
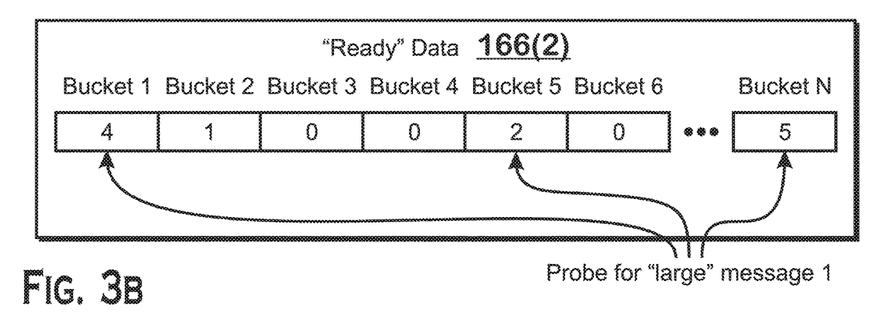

In FIG. 3B, a sending computer system 100(1) sends a probe message for message 1 to the receiver computer system 100(2). In response, the receiver computer system 100(2) checks the ready data 166 to determine whether the receiver computer system 100(2) is ready to receive message 1 by performing the counting filter function on the identifier for message 1 to identify the buckets corresponding to message 1 (buckets 1, 5, and N) and determining whether the corresponding buckets (bucket 1, bucket 5, and bucket N) have non-zero values. Because all such buckets have non-zero values, the receiver computer system 100(2) determines that the receiver computer system 100(2) is ready to receive message 1.

Figure 3C:
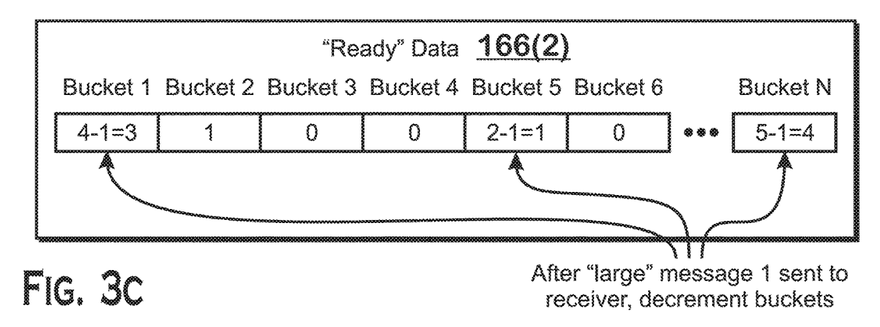

In response to determining that the receiver computer system 100(2) is ready to receive message 1, the receiver computer system 100(2) transmits an indication of that readiness to the sending computer system 100(1). The sending computer system 100(1) then transmits the large message to the receiver computer system 100(2), which consumes the transmitted message. FIG. 3C illustrates a modification to the ready data 166 that occurs in response to the receiver computer system 100(2) consuming the message. More specifically, in response to the receiver computer system 100(2) consuming the message, the receiver computer system 100(2) decrements the value for each of the buckets corresponding to message 1 (buckets 1, 5, and N).

Figure 3D:
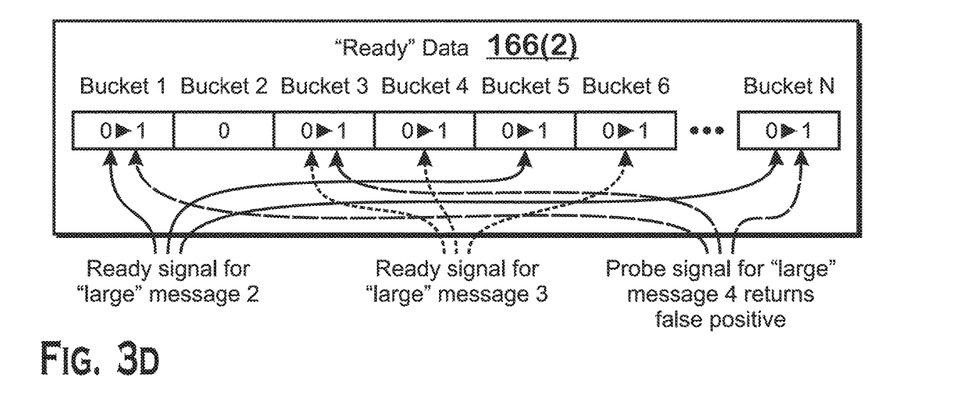
Figure 3E:
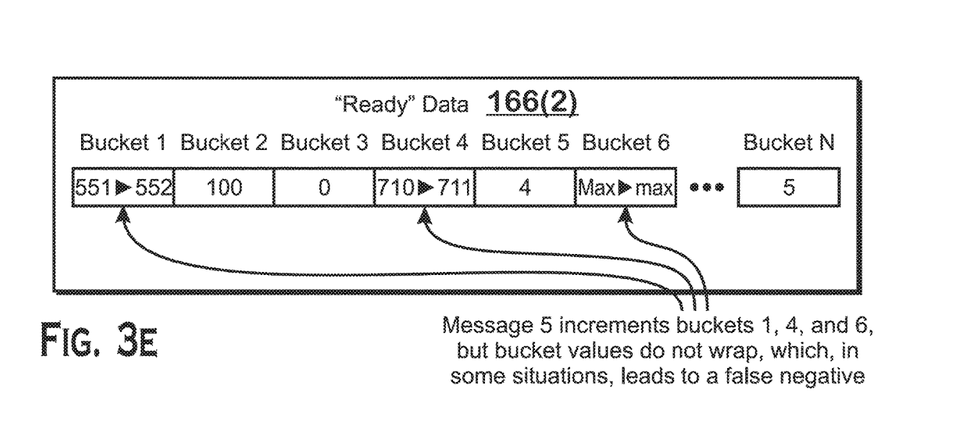

FIGS. 3D and 3E illustrate false positives and false negatives that sometimes occur, according to some examples. FIG. 3D illustrates an example of a false positive occurring. More specifically, in FIG. 3D, the readiness of messages 2 (which maps to buckets 1, 5, and N) and message 3 (which maps to buckets 3, 4, and 6) have caused buckets 1, 3, 4, 5, 6, and N to have values 1, while bucket 2 has value 0. The receiver computer system 100(2) receives a probe signal for message 4. Message 4 maps to bucket 1, bucket 3, and bucket N. Because those buckets all have non-zero values, the result of the probe signal is interpreted as the receiver computer system 100(2) being ready to receive message 4. However, in the example illustrated, the ready data 166 has not actually yet been updated with an indication that the receiver computer system 100(2) is ready to receive message 4. The incorrect interpretation is due to the buckets being updated based on a combination of the updates for message 2 and message 3.

The consequence of a false positive is that the sending computer system 100(1) receives an indication that the receiver computer system 100(2) is ready to receive the message. In response, the sending computer system 100(1) transmits the message to the receiver computer system 100(2). The message waits in the buffer 162 of the receiver computer system 100(2) until the receiver computer system 100(2) is ready to consume that message. This scenario is similar to the scenario that would occur without the improvements described herein. More specifically, without the improvements described herein, the sending computer system 100(1) would send a message without checking whether the receiver computer system 100(2) is ready to receive that message. Thus, in the case of a false positive, the performance is approximately the same as if the improvement described herein did not exist.

FIG. 3E illustrates a false negative that can sometimes occur, according to some examples. More specifically, in FIG. 3E, message 5 becoming ready causes bucket 1, bucket 4, and bucket 6 to increment. However, because bucket 6 is already at the maximum value, the value of bucket 6 does not increment but instead stays the same. If, subsequently, a number of messages that map to bucket 6 equal to or greater than the maximum value of bucket 6 are consumed by the receiver, a subsequent ready probe for a message that maps to bucket 6 would result in a "not ready" outcome, even if the receiver computer system 100(2) was ready to receive the message. For this reason, the sending computer system 100(1) implements a timeout mechanism for messages. More specifically, after the sending computer system 100(1) has a message to transmit, the sending computer system 100(1) initiates a timeout timer. When a timeout time elapses, the sending computer system 100(1) transmits the message to the receiver computer system 100(2) regardless of whether the sending computer system 100(1) has received a message indicating that the receiver computer system 100(2) is ready to receive the message.

Figure 4:
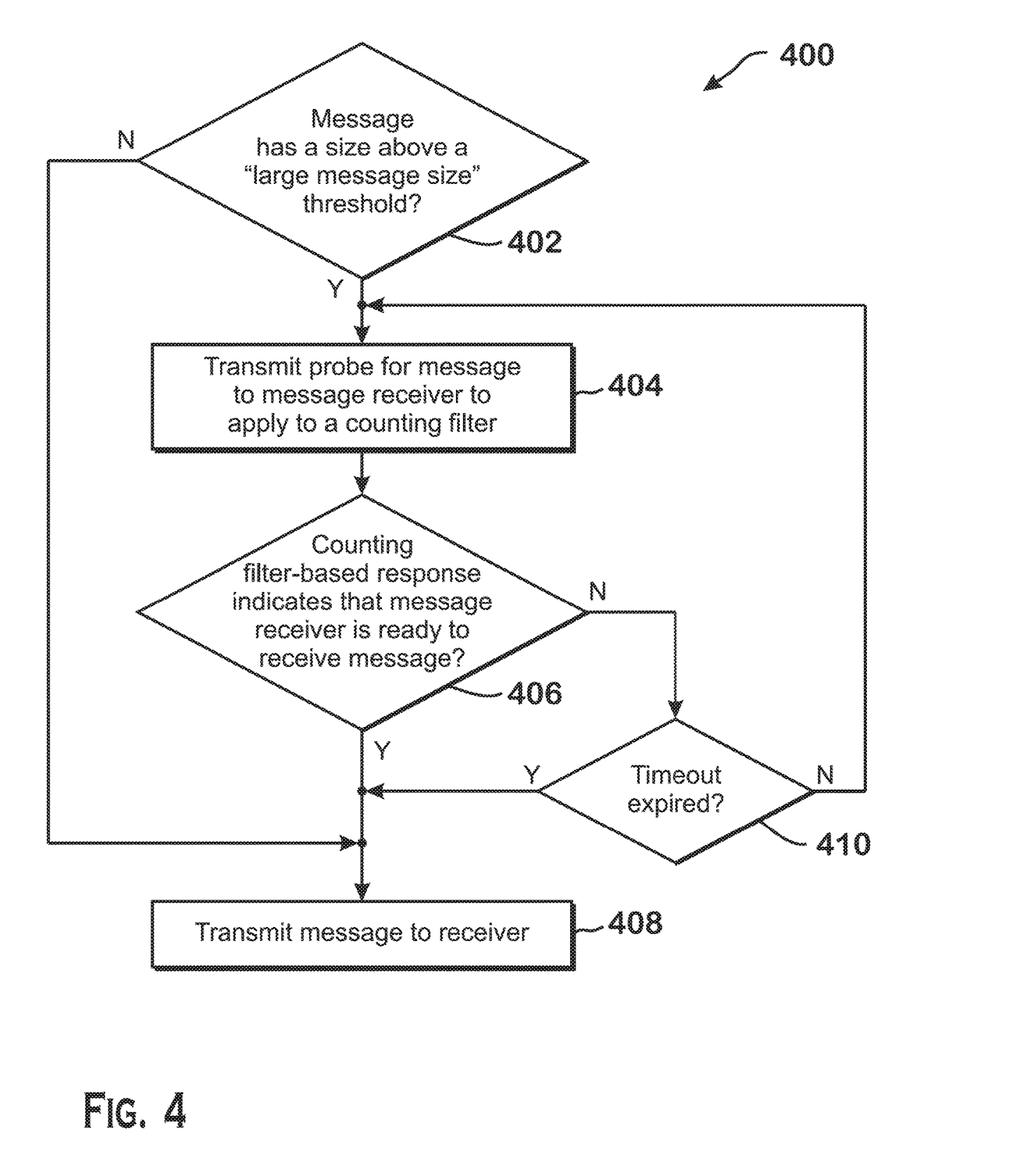
FIG. 4 is a flow diagram of a method for transmitting and receiving messages in a computer system, according to an example.

FIG. 4 is a flow diagram of a method 400 for transmitting and receiving messages in a computer system, according to an example. Although described with respect to the system of FIGS. 1A-1B, 2, and 3A-3E, the method 400 should be understood as being able to be performed by any technically feasible system capable of doing so. Furthermore, the steps of the method 400 may be performed in any technically feasible order and the present disclosure is not limited to any particular order.

The method 400 begins at step 402, where a sending computer system 100(1) determines that a message to be transmitted to a receiver computer system 100(2) has a size above a large message size threshold and is therefore considered a large message. In some examples, the threshold is determined based on the memory capacity and buffer size of the receiving computer, or the average buffer utilization (i.e., average percentage of used space). For messages that are not considered large, the sending computer system 100(1) bypasses method 400 and transmits the message to the receiver computer system 100(2).

At step 404, the sending computer system 100(1) transmits a probe for the message to the receiver computer system 100(2). The probe includes an identification of the message with which the receiver computer system 100(2) checks a counting filter to determine whether the receiver computer system 100(2) is ready to receive the identified message. The receiver computer system 100(2) applies the message identification in the probe to the counting filter to determine whether the receiver computer system 100(2) is ready to receive the message. If the receiver computer system 100(2) is ready to receive the message, then the receiver computer system 100(2) transmits a response to the sending computer system 100(1) indicating that the receiver computer system 100(2) is ready to receive the message. If the receiver computer system 100(2) is not ready to receive the message, then the receiver computer system 100(2) transmits a response to the sending computer system 100(1) indicating that the receiver computer system 100(2) is not ready to receive the message.

At step 406, the sending computer system 100(1) determines whether the response from the receiver computer system 100(2) (which response is based on the results of applying the message identifier to the counting filter) indicates that the receiver computer system 100(2) is ready to receive the message. If the receiver computer system 100(2) is ready to receive the message, then the method 400 proceeds to step 408 (where the sending computer system 100(1) transmits the message to the receiver computer system 100(2)) and if the receiver computer system 100(2) is not ready to receive the message, then the method 400 proceeds to step 410.

At step 410, the sending computer system 100(1) determines whether a timeout for negative responses from the receiver computer system 100(2) has expired. As described above, the counting filter sometimes produces false negatives. Because false negatives may continue occurring well after a receiver computer system 100(2) becomes ready to receive a message from the sending computer system 100 (1), the sending computer system 100(1) transmits the message to the receiver computer system after a timeout has occurred even if the sending computer system 100(1) receives a negative response (i.e., indicating that the receiver computer system 100(2) is not ready to receive the message) in response to a probe. As described above, the timeout is measured from a time at or after the sending computer system 100(1) sends the probe to the receiver computer system 100(2). If at step 410 the timeout has expired, then the method 400 proceeds to step 408 where the sending computer system 100(1) transmits the message to the receiver computer system 100(2). If at step 410, the timeout has not yet expired, then the method 400 returns to step 404 where the sending computer system 100(1) again transmits a probe to the receiver computer system 100(2) to determine whether the receiver computer system 100(2) is ready to receive the message. In some implementations, the sending computer system 100(1) waits a certain amount of time before retransmitting a probe at step 404 after looping back from step 410 due to the timeout not yet being expired. In one alternative for step 410, instead of the sending computer system 100(1) retransmitting a probe to the receiver computer system 100(2) after a timeout the receiver computer system 100(2) informs the sending computer system 100(1) when the receiver computer system 100(2) is ready to receive the message. More specifically, when the receiver computer system receives a probe and is not yet ready to receive the message associated with that probe, the receiver computer system keeps an indication of that probe in a buffer. This buffer effectively stores a list of outstanding requests from the sending computer system 100(1). When the receiver computer system becomes ready to receive a message, the receiver computer system 100(2) checks the buffer to see whether the message that is ready to be received is included in the list of outstanding requests, and if so, informs the sending computer system 100(1) that the receiver computer system 100(2) is ready to receive the message.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transmitting messages among computer systems of a networked computing system, the method comprising:
    responsive to determining, by a sending computer system of the computer systems, that a first message has a size above a threshold, transmitting a ready probe from the sending computer system to a receiver computer system of the computer systems of the networked computing system, the ready probe including an identifier for the first message, the ready probe causing the receiver computer system to query a counting filter of the receiver computer system to determine whether the receiver computer system is ready to consume the first message, wherein querying the counting filter comprises identifying a set of buckets associated with the first message, determining that the receiver computer system is ready to consume the first message if values of the identified set of buckets are all non-zero, and determining that the receiver computer system is not ready to consume the first message if at least one of the values of the identified set of buckets is zero;
    receiving a ready probe response from the receiver computer system, the ready probe response indicating whether the receiver computer system is ready to consume the first message;
    if the ready probe response indicates that the receiver computer system is ready to consume the first message, then transmitting the first message from the sending computer system to the receiver computer system; and
    if the ready probe response indicates that the receiver computer system is not ready to consume the first message, then preventing transmission of the first message to the receiver computer system.

2. The method of claim 1, wherein:
    the receiver computer system is ready to consume the data of the first message after software executing on the receiver computer system executes a request to receive the first message.

3. The method of claim 1, wherein the receiver computer system is configured to update the counting filter in response to the receiver computer system becoming ready to receive the first message by:
    identifying the set of buckets associated with the first message; and
    incrementing values in each of the sets of buckets associated with the first message.

4. The method of claim 1, wherein the receiver computer system is configured to update the counting filter in response to the receiver computer consuming the first message by:
    identifying the set of buckets associated with the first message; and
    decrementing values in each of the sets of buckets associated with the first message.

5. The method of claim 1, wherein:
    a false positive occurs, in which the ready probe response indicates that the receiver computer system is ready to consume the first message but the receiver computer system is not actually ready to consume the first message; and
    responsive to the ready probe response indicating that the receiver computer system is ready to consume the first message, transmitting the first message to the receiver computer system in response to the false positive.

6. The method of claim 5, wherein:
    transmitting the first message to the receiver computer system in response to the false positive causes the first message to be stored in a buffer of the receiver system until the receiver system becomes ready to consume the data of the first message.

7. The method of claim 1, wherein:
    a false negative occurs, in which the ready probe response indicates that the receiver computer system is not ready to consume the first message but the receiver computer system is ready to consume the first message; and
    the method further comprises transmitting the first message to the receiver computer system after a timeout period elapses, in response to the false negative.

8. The method of claim 1, further comprising:
    responsive to determining that a second message for transmission to the receiver computer system has a size that is lower than the threshold, transmitting the second message to the receiver computer without performing a check involving the counting filter.

9. A networked computer system comprising:

a sending computer system; and a receiver computer system, wherein the sending computer system is configured to:

responsive to determining that a first message has a size above a threshold, transmit a ready probe to the receiver computer system, the ready probe including an identifier for the first message, the ready probe causing the receiver computer system to query a counting filter of the receiver computer system to determine whether the receiver computer system is ready to consume the first message, wherein querying the counting filter comprises identifying a set of buckets associated with the first message, determining that the receiver computer system is ready to consume the first message if values of the identified set of buckets are all non-zero, and determining that the receiver computer system is not ready to consume the first message if at least one of the values of the identified set of buckets is zero;

receive a ready probe response from the receiver computer system, the ready probe response indicating whether the receiver computer system is ready to consume the first message;

if the ready probe response indicates that the receiver computer system is ready to consume the first message, then transmit the first message to the receiver computer system; and if the ready probe response indicates that the receiver computer system is not ready to consume the first message, then prevent transmission of the first message to the receiver computer system.

10. The computer system of claim 9, wherein:

the receiver computer system is ready to consume the data of the first message after software executing on the receiver computer system executes a request to receive the first message.

11. The computer system of claim 9, wherein:

the receiver computer system is configured to update the counting filter in response to the receiver computer system becoming ready to receive the first message by:

identifying the set of buckets associated with the first message; and incrementing values in each of the sets of buckets associated with the first message.

12. The computer system of claim 9, wherein:

the receiver computer system is further configured to update the counting filter in response to the receiver computer system consuming the first message by:

identifying the set of buckets associated with the first message; and decrementing values in each of the sets of buckets associated with the first message.

13. The computer system of claim 9, wherein:

a false positive occurs, in which the ready probe response indicates that the receiver computer system is ready to consume the first message but the receiver computer system is not actually ready to consume the first message; and the messaging unit is further configured to, responsive to the ready probe response indicating that the receiver computer system is ready to consume the first message, transmit the first message to the receiver computer system in response to the false positive.

14. The computer system of claim 13, wherein:

transmitting the first message to the receiver computer system in response to the false positive causes the first message to be stored in a buffer of the receiver system until the receiver system becomes ready to consume the data of the first message.

15. The computer system of claim 9, wherein:

a false negative occurs, in which the ready probe response indicates that the receiver computer system is not ready to consume the first message but the receiver computer system is ready to consume the first message; and the sending computer system is further configured to transmit the first message to the receiver computer system after a timeout period elapses, in response to the false negative.

16. The computer system of claim 9, wherein the sending computer system is further configured to:

responsive to determining that a second message for transmission to the receiver computer system has size that is lower than the threshold, transmit the second message to the receiver computer without performing a check involving the counting filter.

* * * * *